(12) United States Patent
Bloomer et al.

(10) Patent No.: US 7,540,269 B2
(45) Date of Patent: Jun. 2, 2009

(54) INDUCTION SYSTEM WITH COMMON ACTUATOR FOR PLENUM AND RUNNER VALVES

(75) Inventors: Stephen Francis Bloomer, London (CA); Yuhua Zhu, Windsor (CA)

(73) Assignee: Mahle International GmbH, Stuttgart (DE)

( * ) Notice: Subject to any disclaimer, the term of this patent is extended or adjusted under 35 U.S.C. 154(b) by 75 days.

(21) Appl. No.: 11/694,162

(22) Filed: Mar. 30, 2007

(65) Prior Publication Data

US 2007/0234993 A1  Oct. 11, 2007

Related U.S. Application Data

(60) Provisional application No. 60/743,985, filed on Mar. 30, 2006.

(51) Int. Cl.
*F02M 35/10* (2006.01)
(52) U.S. Cl. ............... 123/184.44; 123/184.49
(58) Field of Classification Search ............ 123/184.21, 123/184.38, 184.42, 184.43, 184.44, 184.47, 123/184.48, 184.49, 184.51, 184.53, 184.55, 123/184.56, 184.59
See application file for complete search history.

(56) References Cited

U.S. PATENT DOCUMENTS

| | | | | |
|---|---|---|---|---|
| 1,763,726 A | * | 6/1930 | Timian | 123/184.59 |
| 2,126,649 A | * | 8/1938 | Lytle et al. | 123/184.39 |
| 4,738,233 A | * | 4/1988 | Hitomi et al. | 123/190.2 |
| 5,027,769 A | * | 7/1991 | Yoshida et al. | 123/399 |
| 5,056,473 A | * | 10/1991 | Asaki et al. | 123/184.31 |
| 5,092,285 A | * | 3/1992 | Beaber | 123/184.34 |
| 5,156,116 A | * | 10/1992 | Scherenberg | 123/184.44 |
| 5,590,628 A | * | 1/1997 | Patyi et al. | 123/184.55 |
| 5,632,239 A | * | 5/1997 | Patyi et al. | 123/184.36 |
| 5,638,785 A | * | 6/1997 | Lee | 123/184.35 |
| 5,921,212 A | * | 7/1999 | Karlsson | 123/184.47 |
| 5,967,107 A | * | 10/1999 | Karlsson et al. | 123/184.55 |
| 5,992,370 A | * | 11/1999 | Pringle et al. | 123/184.55 |
| 6,016,780 A | * | 1/2000 | Fischer | 123/184.26 |
| 6,260,528 B1 | * | 7/2001 | Pringle et al. | 123/184.55 |
| 6,637,397 B2 | * | 10/2003 | Ward et al. | 123/184.55 |
| 6,805,087 B2 | * | 10/2004 | Yakabe et al. | 123/184.25 |
| 6,955,149 B1 | * | 10/2005 | Christie et al. | 123/184.55 |
| 6,978,755 B2 | * | 12/2005 | Yamamoto et al. | 123/184.49 |
| 7,080,618 B2 | * | 7/2006 | Park | 123/184.55 |
| 7,370,622 B2 | * | 5/2008 | Bloomer et al. | 123/184.55 |

* cited by examiner

*Primary Examiner*—Hai H Huynh
(74) *Attorney, Agent, or Firm*—Carlson, Gaskey & Olds

(57) ABSTRACT

An example induction system for an engine includes a plenum in fluid communication with multiple primary runners. A plenum valve is arranged between first and second chambers of the plenum, which are respectively in fluid communication with first and second sets of the primary runners. The plenum valve is configured to move between open and closed positions and regulate flow between the first and second chambers. A second runner is arranged upstream from and in fluid communication with the plenum. A runner valve is arranged in the secondary runner and configured to vary the amount of flow through the secondary runner. A common actuator is interconnected to both the plenum and runner valves and is configured to move both of the plenum and runner valves between desired positions to achieve desired valve configurations that tune the engine.

18 Claims, 3 Drawing Sheets

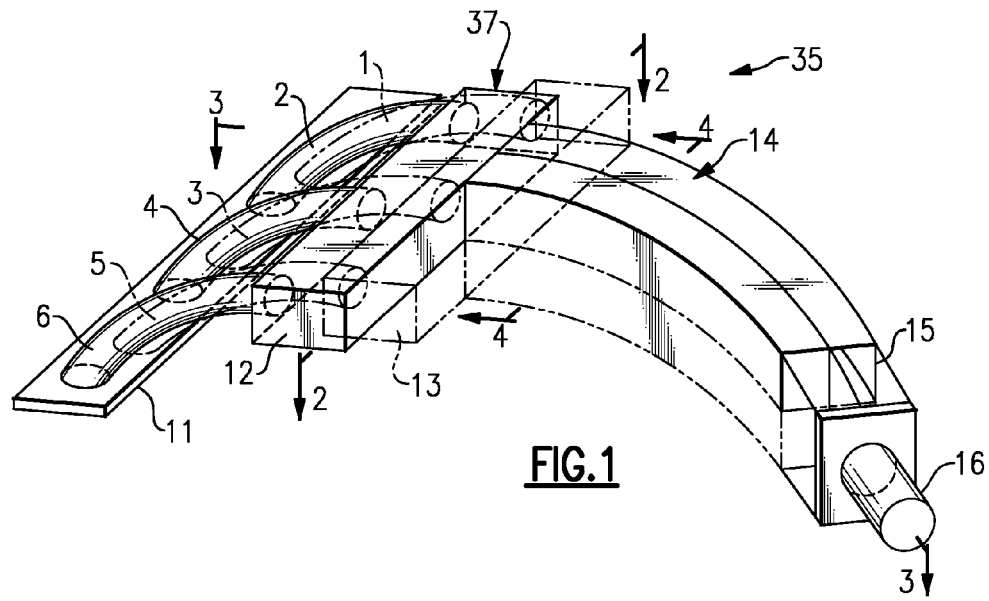
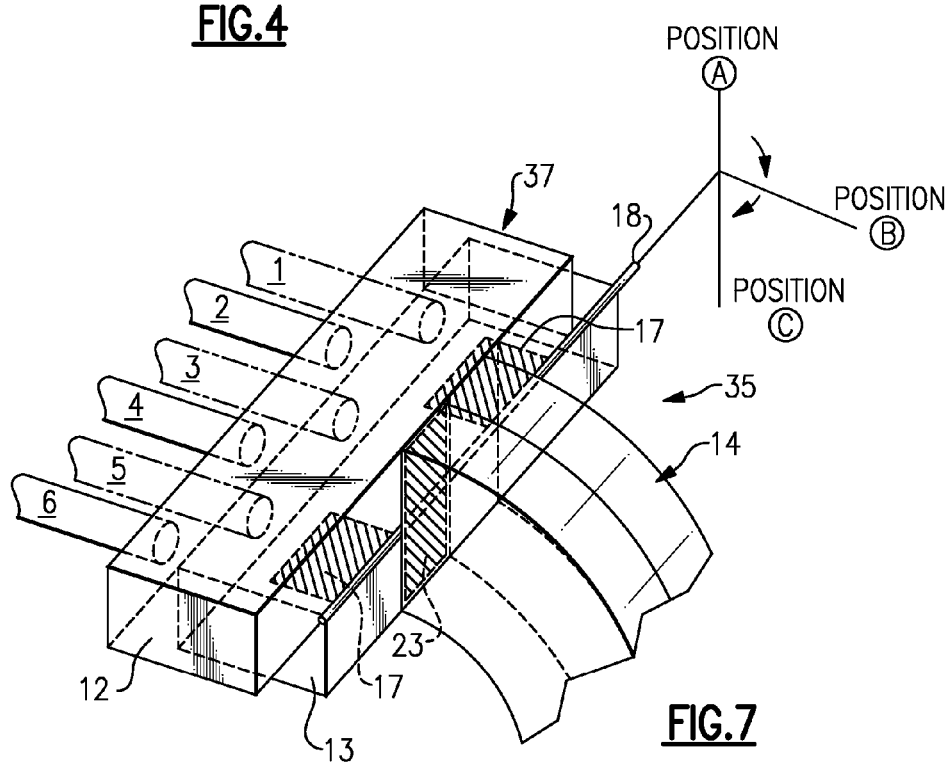

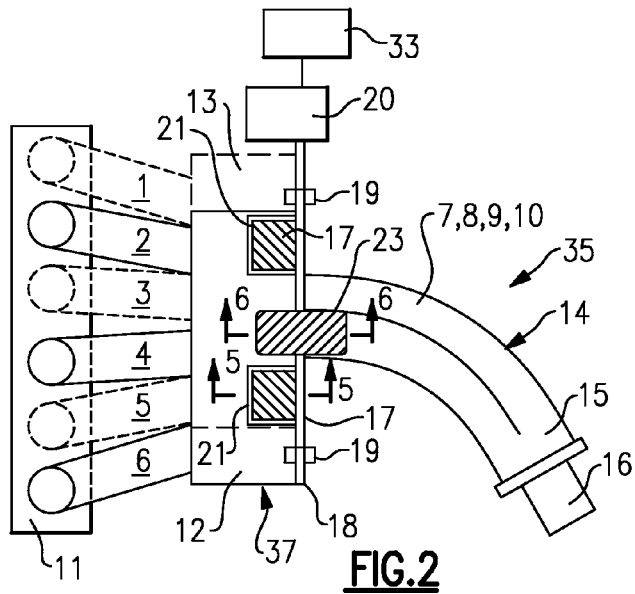
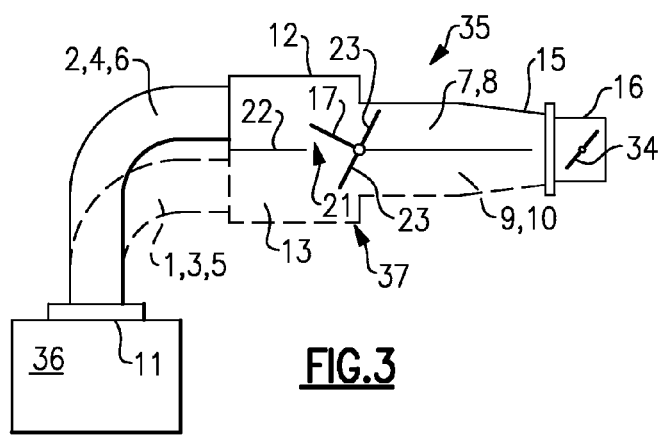
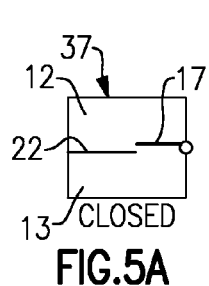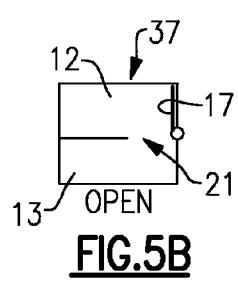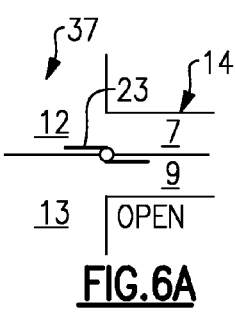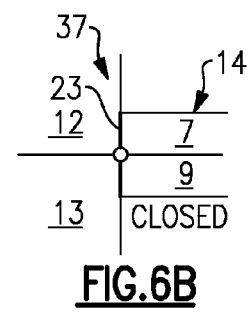

ated range to maximize engine performance. A typical
INDUCTION SYSTEM WITH COMMON ACTUATOR FOR PLENUM AND RUNNER VALVES This application claims benefits to U.S. Provisional Patent Application No. 60/743,985, filed on Mar. 30, 2006.

BACKGROUND

The application relates to induction systems utilizing multiple valves for tuning an engine.

A typical modem induction system for a vehicle engine includes one or more valves used to regulate the flow through the induction system to tune the engine throughout its operating range to maximize engine performance. A typical induction system includes multiple primary runners that each supply air to one of the engine's cylinders. A plenum fluidly joins the primary runners upstream from the cylinders. The plenum receives air from a throttle body.

One example tuning configuration uses a plenum valve arranged within the plenum to regulate the flow between first and second chambers of the plenum that are respectively in fluid communication with first and second sets of primary runners. Opening or closing the plenum valve changes the effective tuning length from the throttle body to each cylinder. As a result, more than one torque peak can be provided by an engine.

The above described plenum valve has been used in combination with a spilt secondary runner arranged between the plenum and the throttle body. The split secondary runner includes a runner valve that is used to vary the effective diameter of the secondary runner to regulate the resonance in the system. The plenum and runner valves are arranged remotely from one another and require separate actuators to move each of the valves.

What is needed is an induction system that uses a minimal number of actuators to provide effective engine tuning.

SUMMARY

An example induction system for an engine includes a plenum in fluid communication with multiple primary runners. A plenum valve is arranged between first and second chambers of the plenum, which are respectively in fluid communication with first and second sets of the primary runners. The plenum valve is configured to move between open and closed positions and regulate flow between the first and second chambers. A second runner is arranged upstream from and in fluid communication with the plenum. A runner valve is arranged in the secondary runner and configured to vary the amount of flow through the secondary runner. A common actuator is interconnected to both the plenum and runner valves and is configured to move both of the plenum and runner valves between desired positions to achieve desired valve configurations that tune the engine.

Accordingly, the example induction system is greatly simplified and made more cost effective by using the same actuator to move both the plenum valve and the runner valve.

These and other features of the application can be best understood from the following specification and drawings, the following of which is a brief description.

BRIEF DESCRIPTION OF THE DRAWINGS

FIG. 1 is a schematic perspective view of an example induction system.

FIG. 2 is a cross-sectional view of the induction system shown in FIG. 1 and taken along line 2-2.

FIG. 3 is a cross-sectional view of the induction system shown in FIG. 1 taken along line 3-3.

FIG. 4 is a cross-sectional view taken along line 4-4 in FIG. 1.

FIG. 5A is a cross-sectional view through a plenum valve shown in FIG. 2 taken along line 5-5 with the plenum valve in a closed position.

FIG. 5B is a cross-sectional view through the plenum valve shown in FIG. 2 taken along line 5-5 with the plenum valve in an open position.

FIG. 6A is a cross-sectional view through a runner valve shown in FIG. 2 taken along line 6-6 with the runner valve in an open position.

FIG. 6B is a cross-sectional view through the runner valve shown in FIG. 2 taken along line 6-6 with the runner valve in a closed position.

FIG. 7 is a schematic perspective view of the plenum and runner valves shown in FIG. 2 arranged in a first position.

DETAILED DESCRIPTION OF THE PREFERRED EMBODIMENT

Figure 9:
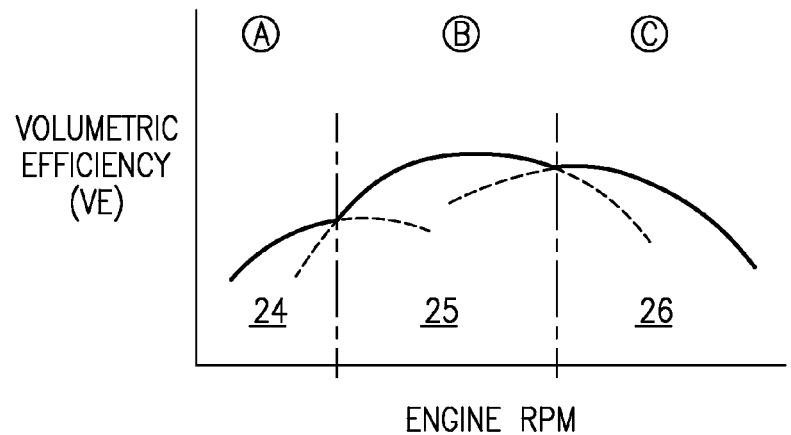
FIG. 9 is a graph depicting volumetric efficiency versus engine speed with the plenum and runner valves configured in the first, second and third positions.

An induction system 35 is schematically shown in FIGS. 1-3. The induction system 35 provides air from a throttle body 16 to an engine 36, which includes a throttle valve 34 for regulating the amount of air into the induction system 35. The engine 36 can be any configuration and with any number of cylinders. The induction system 35 includes multiple primary runners 1-6 that each supply air to an individual cylinder of the engine 36, in one example. The primary runners 1-6 are secured to the engine 36 using a mounting flange 11.

A plenum 37 is arranged upstream from the primary runners 1-6. The plenum 37 includes first and second chambers 12, 13. Each of the first and second chambers 12, 13 supplies air to a set of primary runners. In one example, the primary runners 1, 3, 5 receive air from the second chamber 13, and the primary runners 2, 4, 6 receive air from the first chamber 12.

A secondary runner assembly 14 fluidly interconnects the plenum 37 and the throttle body 16. In the example shown in the Figures, the secondary runner assembly 14 includes secondary runners 7-10, which are best shown in FIG. 4. Secondary runners 7, 8 are fluidly connected to the first chamber, and secondary runners 9, 10 are fluidly connected to the second chamber 13. In one example, the secondary runners 7-10 are configured such that the length of secondary runners 8, 10 is longer than the length of runners 7, 9. A diffuser section 15 is arranged between the throttle body 16 and the secondary runners 7-10.

Referring to FIGS. 2 and 7, the secondary runners 8, 10 configured to continually supply air to the plenum 37 from the throttle body 16. That is, the effective cross-sectional areas of the secondary runners 8, 10 are not varied. However, a runner valve 23 is arranged between the secondary runners 7, 9 to selectively provide air from the secondary runners 7, 9 to the plenum 37. The runner valve 23 is used to regulate the amount of flow through the secondary runner assembly 14 and to supplement the flow of air to the plenum 37 provided through the secondary runners 8, 10.

At least one plenum valve 17 is arranged within the plenum 37 to selectively separate the first and second chambers 12, 13. In the example shown, a plenum valve 17 is arranged on either side of the secondary runner assembly 14 where it connects to the plenum 37. In the example shown, the plenum and runner valves 17, 32 are supported on a common shaft 18, which is supported on bearings 19 relative to the plenum 37. The plenum and runner valves 17, 23 can be cantilevered or of a butterfly-type. In the example, the shaft 18 is rotatable through 180 degrees between extreme positions.

An actuator 20 is coupled to the shaft 18 and rotates the shaft and the supported plenum and runner valves 17, 23 in response to a command from a controller 33, which communicates with the actuator 20. In one example, the shaft 18 is rotated between first, second and third valve configurations A, B, C, which correspond to desired valve configurations based upon engine operating parameters. Upon determining a particular engine operating parameter, such as engine speed, the controller 33 command the actuator to move the plenum and runner valves 17, 23 to a desired valve configuration.

Referring to FIGS. 5A and 5B, the plenum valves 17 are movable between closed and open positions. In the closed position (FIG. 5A), the plenum valves 17 cooperate with a partition 22 to separate the first and second chambers 12, 13 to provide separated plenum volumes respectively in fluid communication with the first and second sets of primary runners 1-6. The plenum valves 17 can be rotated to an open position (FIG. 5B) exposing an opening 21 between the first and second chambers 12, 13 to permit fluid flow between the first and second chambers 12, 13.

Referring to FIGS. 6A and 6B, the runner valve 23 is rotatable between open and closed positions. In the open position (FIG. 6A), the secondary runners 7-9 provide supplemental flow to the first and second chambers 12, 13 respectively thereby increasing the amount of flow provided to the plenum 37 by the secondary runner assembly 14. In the closed position (FIG. 6B), the closed runner valve 23 reduces the amount of flow to the plenum 37.

Figure 8:
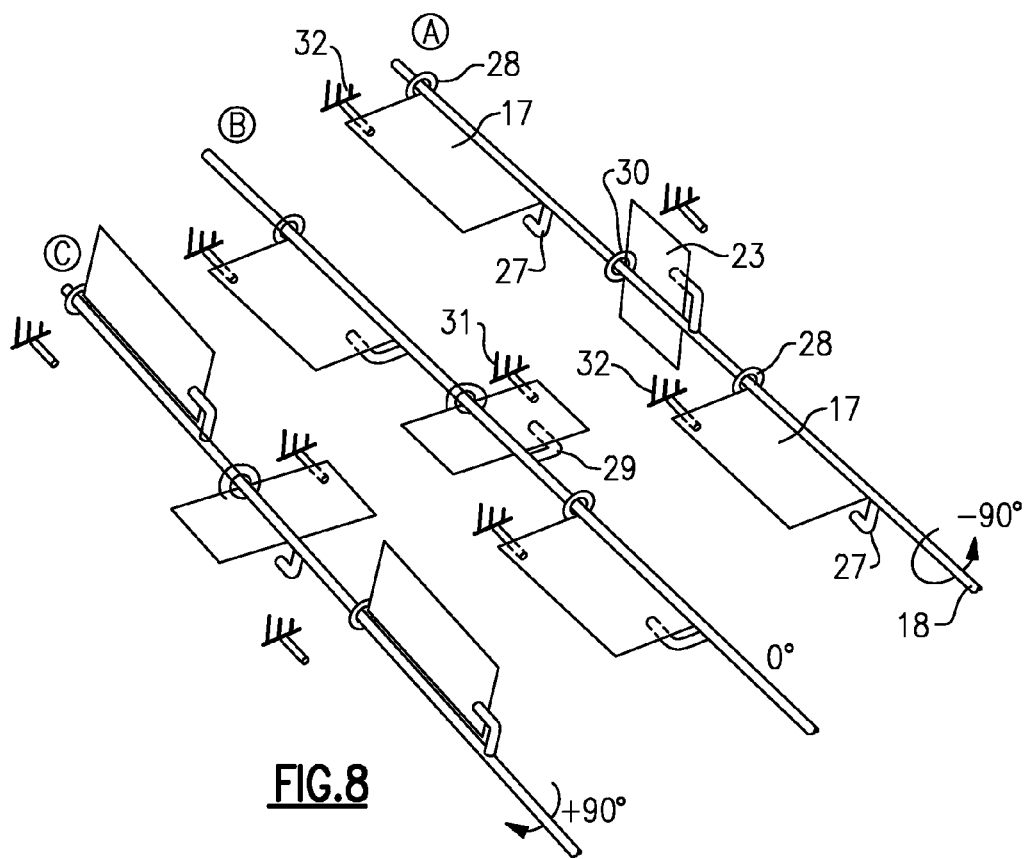
FIG. 8 is a schematic view of the plenum and runner valves in first, second and third positions.

The plenum and runner valve 17, 23 are shown in the first, second and third positions A, B, C in FIG. 8. In the example shown, the shaft 18 includes arms 27, 29 that engage the plenum and runner valves 17, 23 to rotate them between the various positions. The plenum 37 includes stops 31, 32, which may be provided by surfaces of the plenum 37 for example, to limit the rotation of the plenum and runner valves 17, 23 and define the desired valve positions. In the example, the plenum and runner valves 17, 23 are rotatable 90 degrees between the open and closed positions. Torsion springs 28, 30, for example, are arranged between the plenum and runner valves 17, 23, respectively, to bias the plenum and runner valves 17, 23 against the arms 27, 29 and/or stops 31, 32.

The first valve configuration A positions both the plenum and runner valves 17, 23 in the closed position, which improves volumetric efficiency in the low engine speed range, as illustrated at 24 in FIG. 9. The torsion springs 28 bias the plenum valves 17 into engagement with the stops 32, and the torsion spring 30 biases the runner valve 23 into engagement with the arm 29.

The second valve configuration B maintains the plenum valves 17 in the closed position and opens the runner valve 23, increasing the amount of flow into the plenum 37. The second valve configuration B increases the volumetric efficiency in the intermediate engine speed range, as shown at 25 in FIG. 9. The torsion springs 28 bias the plenum valves 17 into engagement with the arms 27 and/or stops 32, and the torsion spring 30 biases the runner valve 23 into engagement with the arm 29 and/or stop 31.

The third valve configuration C maintains the runner valve 23 in the open position and opens the plenum valves 17 permitting air to flow between the first and second chambers 12, 13, which improves the volumetric efficiency in the high engine speed range, shown at 26 in FIG. 9. The torsion springs 28 bias the plenum valves 17 into engagement with the arms 27, and the torsion spring 30 biases the runner valve 23 into engagement with the stop 31.

Although an example embodiment has been disclosed, a worker of ordinary skill in this art would recognize that certain modifications would come within the scope of the claims. For that reason, the following claims should be studied to determine their true scope and content.

What is claimed is:

1. An induction system for an engine comprising:
   a plenum in fluid communication with multiple primary runners that are arranged downstream from the plenum;
   at least one plenum valve arranged between first and second chambers of the plenum that are respectively in fluid communication with first and second sets of the primary runners, the at least one plenum valve configured to move between open and closed positions and regulate flow between the first and second chambers;
   a secondary runner arranged upstream from and in fluid communication with the first and second chambers;
   at least one runner valve arranged in the secondary runner and configured to vary the amount of flow through the secondary runner into the first and second chambers; and
   a common actuator interconnected to both the at least one plenum and runner valves and configured to move the at least one plenum and runner valves between desired positions and regulate the flow between both the first and second chambers and between the secondary runner and the primary runners.

2. The induction system according to claim 1, wherein each of the first and second sets include at least two primary runners.

3. The induction system according to claim 1, wherein the closed position generally blocks flow between the first and second chambers.

4. The induction system according to claim 1, wherein the plenum is arranged fluidly between the primary and secondary runners.

5. The induction system according to claim 1, comprising a throttle body arranged upstream from the secondary runner configured to supply air thereto.

6. An induction system for an engine comprising:
   a plenum in fluid communication with multiple primary runners that are arranged downstream in from the plenum;
   at least one plenum valve arranged between first and second chambers of the plenum that are respectively in fluid communication with first and second sets of the primary runners, the at least one plenum valve configured to move between open and closed positions and regulate flow between the first and second chambers;
   a secondary runner arranged upstream from and in fluid communication with the plenum;
   at least one runner valve arranged in the secondary runner and configured to vary the amount of flow through the secondary runner;
   a common actuator interconnected to both the at least one plenum and runner valves and configured to move the at least one plenum and runner valves between desired positions; and
   a controller commanding the at least one plenum valve and runner valve between multiple positions to a desired valve configuration in response to an engine parameter.

7. The induction system according to claim 6, wherein the engine parameter includes low, intermediate and high engine speeds that each correspond to a desired position that is different from other desired positions.

8. The induction system according to claim 7, wherein the low engine speed corresponds to the at least one plenum and runner valves being in closed positions.

9. The induction system according to claim 8, wherein the intermediate engine speed corresponds to the at least one plenum valve being arranged in the closed position and the at least one runner valve in an open position.

10. The induction system according to claim 9, wherein the high engine speed corresponds to the at least one plenum valve being in the open position and the at least one runner valve in the open position.

11. The induction system according to claim 6, wherein the at least one plenum and runner valves are supported by a common shaft and an actuator is interconnected to the shaft for rotating the at least one plenum and runner valves multiple positions with the shaft.

12. The induction system according to claim 11, wherein the shaft includes at least one arm configured to selectively engage the at least one plenum and runner valves for rotating at least one of the at least one plenum and runner valves between the multiple positions.

13. The induction system according to claim 12, comprising at least one torsion spring arranged between at least one of the at least one plenum and runner valves and the shaft for biasing the at least one of the at least one plenum and runner valves against the at least one arm and at least one stop, the at least one stop providing a valve position limit, wherein the at least one arm being engaged with the at least one of the at least one plenum and runner valves in one of the multiple positions and disengaged from the at least one of the at least one plenum and runner valves in another of the multiple positions.

14. The induction system according to claim 11, wherein the shaft is rotatable through 180 degrees between the multiple positions, and the at least one plenum and runner valves are rotatable 90 degrees between the multiple positions.

15. The induction system according to claim 11, wherein the shaft is rotatable about an axis, and the at least one plenum valve is axially spaced from the at least one runner valve along the axis of the shaft.

16. An induction system for an engine comprising:
a plenum in fluid communication with multiple primary runners that are arranged downstream from the plenum;
at least one plenum valve arranged between first and second chambers of the plenum that are respectively in fluid communication with first and second sets of the primary runners, the at least one plenum valve configured to move between open and closed positions and regulate flow between the first and second chambers;
a secondary runner arranged upstream from and in fluid communication with the plenum, wherein the plenum is arranged fluidly between the primary and secondary runners;
at least one runner valve arranged in the secondary runner and configured to vary the amount of flow thorough the secondary runner;
a common actuator interconnected to both the at least one plenum and runner valves and configured to move the at least one plenum and runner valves between desired positions; and
first and second secondary runners, the first secondary runner generally unrestricted between a throttle body and the plenum, and the at least one runner valve associated with the second secondary runner configured to selectively restrict and vary the flow through the second secondary runner.

17. The induction system according to claim 16, wherein the first secondary runner is longer than the second secondary runner.

18. The induction system according to claim 16, wherein the first and second chambers are arranged adjacent to one another, and the at least one runner valve is configured to selectively provide air from the second secondary runner to the first and second chambers.

* * * * *

UNITED STATES PATENT AND TRADEMARK OFFICE
CERTIFICATE OF CORRECTION

PATENT NO. : 7,540,269 B2 Page 1 of 1
APPLICATION NO. : 11/694162
DATED : June 2, 2009
INVENTOR(S) : Bloomer et al.

It is certified that error appears in the above-identified patent and that said Letters Patent is hereby corrected as shown below:

Claim 6, Column 4, Line 48: Delete "in"

Signed and Sealed this

Eighteenth Day of August, 2009

David J. Kappos
*Director of the United States Patent and Trademark Office*